Dec. 13, 1955   J. DUNZ   2,726,742
BRAKE WITH AIR COOLING SCOOP
Filed May 15, 1953   3 Sheets-Sheet 1

Inventor:
Jean DUNZ
by: J. Delattre-Seguy
Attorney

Dec. 13, 1955  J. DUNZ  2,726,742
BRAKE WITH AIR COOLING SCOOP
Filed May 15, 1953  3 Sheets-Sheet 2
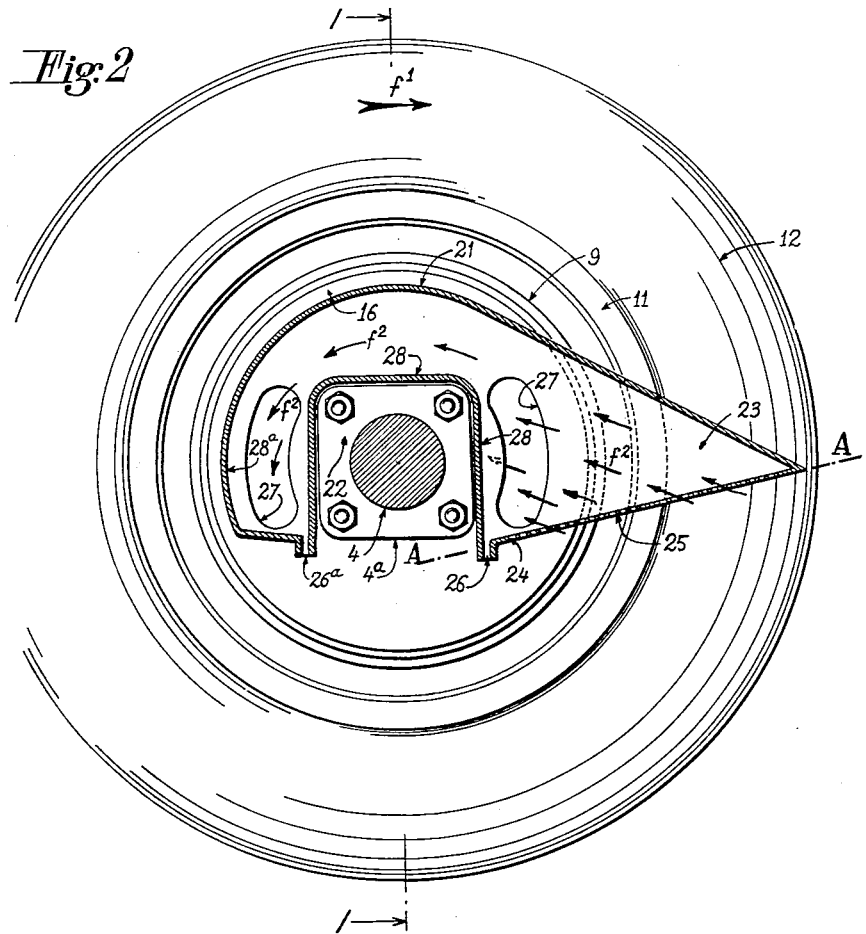
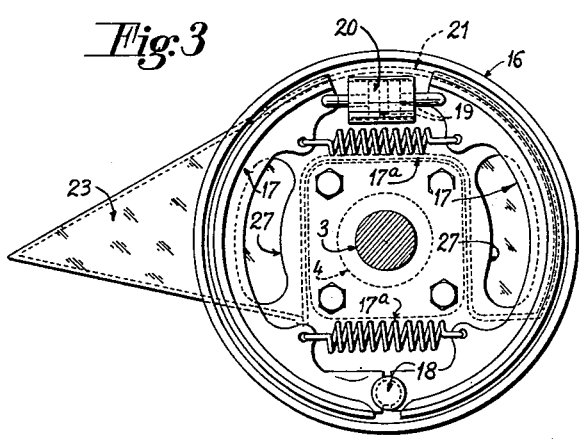
Inventor:
Jean DUNZ
by: /s/ ...Seguy
Attorney Dec. 13, 1955 J. DUNZ 2,726,742
BRAKE WITH AIR COOLING SCOOP
Filed May 15, 1953 3 Sheets-Sheet 3

Inventor:
Jean DUNZ
by J. Delattre-Seguy
Attorney

United States Patent Office 2,726,742
Patented Dec. 13, 1955

2,726,742

BRAKE WITH AIR COOLING SCOOP

Jean Dunz, Nancy, France, assignor to Compagnie De Pont-A-Mousson, Nancy, France, a body corporate of France Application May 15, 1953, Serial No. 355,388

Claims priority, application France May 20, 1952

8 Claims. (Cl. 188—264)

The present invention relates to brake devices for vehicles such as automobiles or the like, this device being of the type which comprises in combination a brake drum, and a brake back plate which carries the brake shoes and is secured to the axle upon which the wheel rotates.

The invention has for its object to provide a device of this type so improved as to obtain an excellent cooling of the brake drum. To this end, the device comprises a cooling-air collector fixed to the brake back plate. The chamber contained within this collector communicates with the surrounding air through at least one air inlet, and, via the interior of the drum, through at least one opening provided in the brake back plate and apertures provided in the dish portion of the brake drum in the neighbourhood of the periphery of this dish portion. Thus, a current of cooling air collected by this collector passes through the brake drum and flows round the peripheral outer surface thereof.

Other features and advantages of the present invention will be apparent from the ensuing description.

In the accompanying drawings:

Fig. 2 is a sectional view on line 2—2 in Fig. 1 to a smaller scale,

Figure 4:
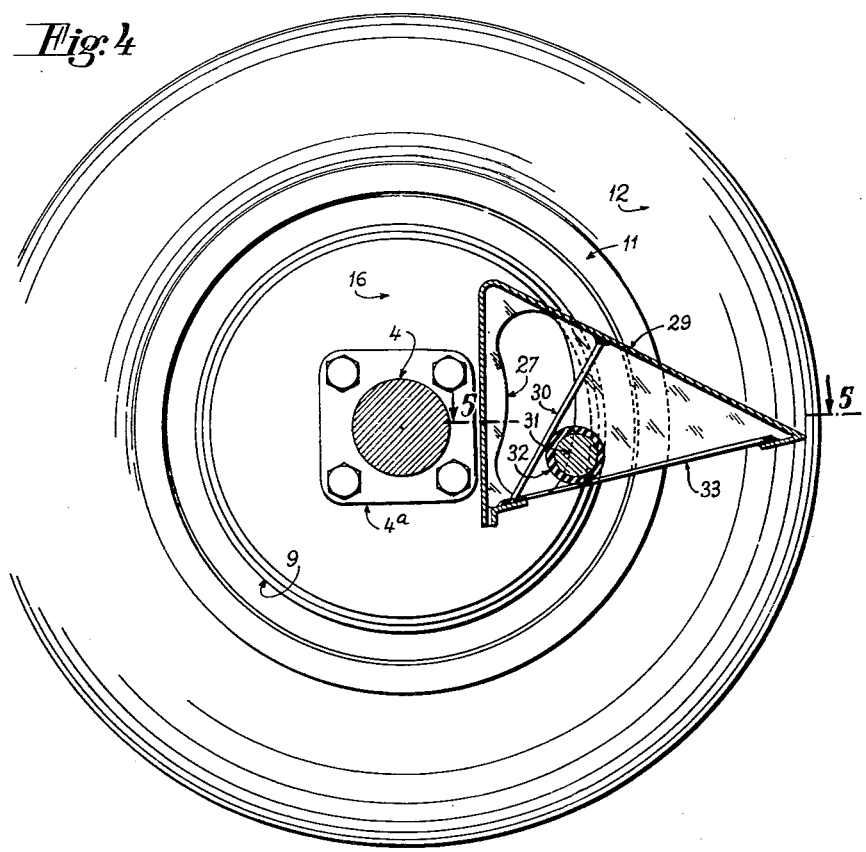
Figure 6:
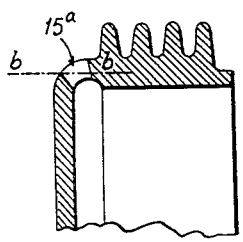
Figure 5:
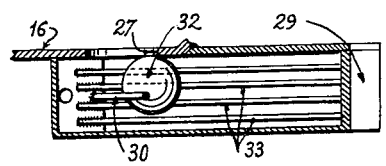

Fig. 3 is a side view of the brake back plate of the wheel, this plate being viewed from the side thereof facing the wheel, Fig. 4 is a similar view to that in Fig. 2 and represents a modification of the collector, Fig. 5 is a fragmentary, horizontal section on line 5—5 in Fig. 4, and Fig. 6 represents a modification of the apertures provided in the brake drum when the latter is combined with a wire or spoked wheel.

Figure 1:
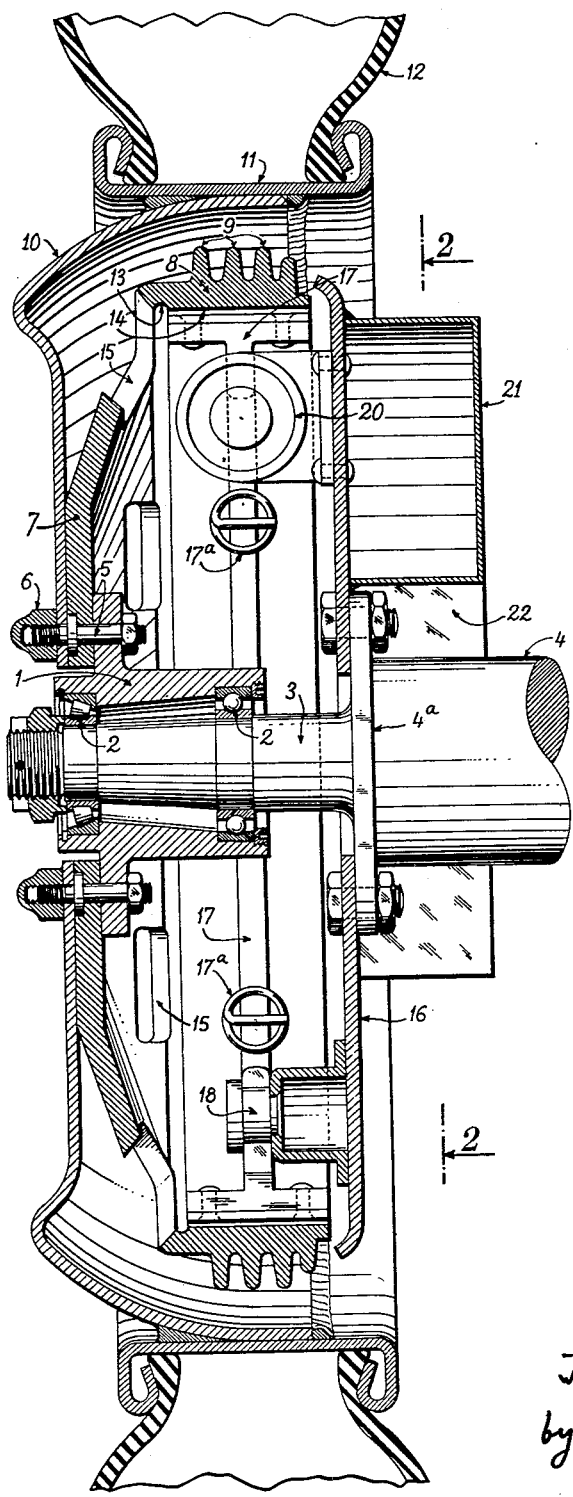
Fig. 1 is a vertical, transverse, diametral section of an automobile wheel and axle equipped with the device according to the invention taken along line 1—1 in Fig. 2.

In the embodiment shown in Figs. 1 to 3, the invention is applied to a vehicle wheel which moves forwards in the direction of arrow $f'$ (Fig. 2). This wheel comprises a hub 1 rotatively mounted, through the medium of a ball bearing 2, on the journal 3 of an axle 4. On this hub 1 is fixed, by means of bolts 5 and nuts 6, the dish portion 7 of a brake drum extended by a brake flange 8 provided on its outer face with cooling fins 9. A disc 10, extended by the rim 11 of the wheel, is also fixed by these bolts and nuts to the hub 1. The rim 11 carries a tire 12.

The brake drum 7 according to the invention comprises: an annular groove 13 disposed along the edge of the inner surface 14 of the flange 8 adjacent the junction between the dish portion 7 and the flange 8, and a number of apertures 15 provided in the dish portion 7 and arranged adjacent the periphery of the dish portion 7.

On a flange $4^a$ on the axle 4 is fixed a back plate 16 which is disposed in front of the open side of the brake drum and which carries the conventional brake devices including substantially semi-circular brake shoes 17. Each of these brake shoes is pivotally mounted at one of its ends on a pin 18 secured to the back plate 16 and is connected at its other end to the connecting-rod of a piston 19 (Fig. 3) which is slidable in a brake cylinder 20 also secured to the back plate 16. Springs $17^a$ serve to return the brake shoes automatically after each braking action.

On the side of the back plate 16 opposite to that on which the brake devices are disposed, is secured, for example by welding, a metal casing 21 which has the general shape of a horseshoe. A recess or opening 22 is provided for receiving the axle 4. This casing 21 is extended towards the front end of the vehicle by a prismatic collector 23, the section of which, taken through a vertical plane parallel to the back plate 16, is substantially triangular. This collector extends substantially up to the periphery of the tire 12 from which it is suitably spaced so as to eliminate any possibility of rubbing between the casing and the tire. The collector 23 is open at its base at 24. The plane AA (Fig. 2) of the lower opening 24 provided in the collector is provided with a fine metal grill 25. The plane of the grill may lie either perpendicular to the vertical plane of the wheel or slightly inclined thereto. In a direction parallel to the longitudinal axis of the vehicle, the grill is substantially horizontal. It may, however, be slightly oblique relative to the horizontal (Fig. 2), i. e. slope downwards in the direction from the front to the rear end of the vehicle. The lower parts of the collector 23 and the casing 21 are provided with apertures 26, $26^a$ (Fig. 2), which face downwards. The back plate 16 is provided with openings 27 through which the casing 21 and its collector 23 communicate with the interior of the brake drum (7, 8).

The device operates in the following manner. When the vehicle moves in the direction of arrow $f'$ (Fig. 2), the air is taken in by the collector 23 in the direction of arrows $f^2$ through the grill 25 which prevents dirt or foreign bodies from penetrating the brake drum through the openings 27. The general velocity component of the air is directed towards the rear end of the vehicle. The air emerges from the interior of the brake drum (7, 8) through apertures 15 which are provided in the rear semi-circumference of the brake drum. Thus, inside the brake drum there is produced a turbulent renewing of air which aids the cooling of the brake parts. Furthermore, after having emerged from the brake drum, the air is directed between the wheel rim 11 and the brake drum and passes over the cooling fins 9 and in this way adds to the cooling effect of the air. Any occasional entry of dirt through the air intake 24 that might occur is stopped by the grill 25, and any water which might enter through the grill 25 is thrown against the front walls 28 and $28^a$ (Fig. 2) of the collector 23 and the casing 21, and runs down these walls and escapes through the apertures 26 and 26a.

The groove 13 is provided in the brake drum for collecting the water which might enter the drum when the vehicle is stationary. This water is thereby prevented from spreading over the braking surface 14. The water which enters through apertures 15 at the upper part of the drum flows along the groove 13 and is evacuated by those apertures 15 which are situated at the bottom part of the drum.

In the modification represented in Figs. 4 and 5, the casing 21 is eliminated and only the collector 29 remains, which has a substantially triangular shape. In this case, the back plate 11 is provided with only one opening 27. The collector is placed in the semi-circle situated on the front side of the wheel with respect to the forward travel of the vehicle. In front of the opening 27 is welded a collector 29, and a rod 30. At least one ball 31 of metal or other heavy material, covered with rubber 32 or other resilient material, is disposed in the front part of this collector. This ball has an outside diameter which is greater than the width of the free space provided on either side of the rod 30 so that it cannot pass between the rod and the wall of the collector and reach the opening 27. The bouncing of this ball in the collector keeps the collector grill free from mud and dirt which would otherwise adhere thereto. This grill is composed of, for example, longitudinally extending members 33 of metal wire or other material such as, for example, rubber.

The foregoing constructions are suitable for a brake drum mounted on a wheel equipped with wheel discs, i. e. a brake drum protected from any projection of dirt or mud by the wheel disc itself. If the wheel is provided with a perforated disc or spokes, the brake drum and the apertures 15 would be unprotected from projections of dirt from the exterior. In this case, the apertures 15ᵃ (Fig. 6) are so arranged that a projection of dirt in a horizontal direction cannot enter directly into the brake drum without encountering the inner wall of the aperture against which wall it breaks.

The invention is not limited to the details of construction herein described and illustrated in the accompanying drawings.

Having now described my invention what I claim as new and desire to secure by Letters Patent is:

1. In a supporting unit for automobile vehicles, in combination: an axle; a wheel journalled on said axle; a brake-drum comprising a dish portion and an annular flange and secured to said wheel coaxially and concentrically with the rim of said wheel; a brake back-plate rigidly attached to said axle; openings in said dish portion; a cooling-air collector attached to said back-plate on the face thereof opposite the side on which the brake-drum is located; said collector being provided with an air intake forward of said axle; apertures in said back-plate adapted to admit air from said collector into said brake-drum; the air so admitted passing through said openings to cool the outer face of said annular flange; said collector having the shape of a prism the cross-section of which, in a plane parallel to said back-plate, is substantially triangular; the forward edge of said collector being substantially level with the forward periphery of said wheel; the bottom of said collector being substantially horizontal; said air intake being disposed in said bottom and occupying substantially the entire surface of said bottom.

2. A unit as claimed in claim 1, in which said bottom of said collector is slightly slanted with respect to the horizontal and rises from the rear to the front of said collector.

3. Vehicle supporting unit as claimed in claim 1, wherein the inlet aperture for the surrounding air comprises a perforated wall, a freely disposed member being situated in said collector, whereby the bouncing thereof in said collector against said perforated wall ensures that the latter is kept free of dirt and mud and therefore clean.

4. Vehicle supporting unit as claimed in claim 3, wherein said freely disposed member comprises a ball provided with a coating of a resilient material.

5. Vehicle supporting unit as claimed in claim 3, wherein a movement limiting device is provided in said collector for limiting the movement of said freely disposed member and preventing the latter from entering said opening provided in said back plate.

6. Vehicle supporting unit as claimed in claim 5, wherein the movement limiting device comprises at least a rod.

7. A unit as claimed in claim 1, in which said collector comprises a substantially horse-shoe shaped, rearward extension casing partially surrounding said axle, said casing and said back-plate being provided with at least one orifice adapted to permit the passage of air from said casing into said brake-drum.

8. Vehicle supporting unit as claimed in claim 7, wherein the casing has, when viewed in longitudinal vertical section, the shape of an upturned U which surrounds the axle.

References Cited in the file of this patent

UNITED STATES PATENTS

| | | |
|---|---|---|
| 905,999 | Emerson | Dec. 8, 1908 |
| 1,957,654 | La Brie | May 8, 1934 |
| 2,105,176 | Ash | Jan. 11, 1938 |
| 2,123,614 | Sinclair | July 12, 1938 |
| 2,248,684 | Levy | July 8, 1941 |

OTHER REFERENCES

"The Autocar," pages 254 to 256, August 7, 1936.